United States Patent
Wang

(10) Patent No.: US 10,666,141 B2
(45) Date of Patent: May 26, 2020

(54) CONTROL DEVICE AND POWER CONVERSION CIRCUIT THEREOF WITH RECONFIGURABLE POWER STRUCTURE

(71) Applicant: Nuvoton Technology Corporation, Hsinchu (TW)

(72) Inventor: Cheng-Chih Wang, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 0 days.

(21) Appl. No.: 16/039,359

(22) Filed: Jul. 19, 2018

(65) Prior Publication Data
US 2019/0028028 A1   Jan. 24, 2019

(30) Foreign Application Priority Data
Jul. 20, 2017   (TW) .............................. 106124234 A

(51) Int. Cl.
*H02M 1/00* (2006.01)
*H02M 3/158* (2006.01)
*H02M 1/08* (2006.01)
*H02M 1/088* (2006.01)

(52) U.S. Cl.
CPC .............. *H02M 3/158* (2013.01); *H02M 1/08* (2013.01); *H02M 1/088* (2013.01); *H02M 2001/0009* (2013.01); *H02M 2001/0045* (2013.01); *H02M 2001/0048* (2013.01)

(58) Field of Classification Search
CPC . H02M 2001/0009; H02M 2001/0045; H02M 2001/0048; H02M 1/08; H02M 1/088; H02M 3/158; G05F 1/56
See application file for complete search history.

(56) References Cited

U.S. PATENT DOCUMENTS

| 5,592,072 A | 1/1997 | Brown |
| 5,773,966 A | 6/1998 | Steigerwald |
| 6,229,289 B1 | 5/2001 | Piovaccari et al. |
| 7,064,531 B1 | 6/2006 | Zinn |
| 2004/0174148 A1 | 9/2004 | Hiraki et al. |

(Continued)

FOREIGN PATENT DOCUMENTS

| TW | 200721647 | 6/2007 |
| TW | 201011490 | 3/2010 |

(Continued)

*Primary Examiner* — Nguyen Tran
*Assistant Examiner* — David A. Singh
(74) *Attorney, Agent, or Firm* — JCIPRNET

(57) ABSTRACT

A control device includes a first switch, a second switch, a switching circuit, a first circuit and a second circuit. The control device is selectively switched to a first mode or a second mode corresponding to an operating current and an operating state of a predetermined circuit. During the first mode, an output signal of the first circuit is transmitted to a control end of the first switch through the switching circuit, and the first circuit and the first switch form a low drop-out regulator. During the second mode, a plurality of driving signals of the second circuit are transmitted to the control end of the first switch and a control end of the second switch through the switching circuit, and the first switch, the second switch and an impedance circuit form a switching voltage converter.

16 Claims, 3 Drawing Sheets

(56) References Cited

U.S. PATENT DOCUMENTS

| | | | | |
|---|---|---|---|---|
| 2006/0158165 | A1* | 7/2006 | Inn | G05F 1/575 |
| | | | | 323/280 |
| 2009/0295344 | A1* | 12/2009 | Qu | G05F 1/56 |
| | | | | 323/265 |
| 2013/0021012 | A1* | 1/2013 | Oddoart | H02M 3/156 |
| | | | | 323/282 |
| 2015/0035507 | A1* | 2/2015 | Cowley | G05F 1/46 |
| | | | | 323/282 |
| 2015/0042295 | A1* | 2/2015 | Cowley | H02M 3/158 |
| | | | | 323/269 |
| 2015/0042300 | A1* | 2/2015 | Peker | H02M 3/156 |
| | | | | 323/274 |
| 2016/0006340 | A1* | 1/2016 | Xu | H02M 3/156 |
| | | | | 323/271 |
| 2016/0105111 | A1* | 4/2016 | Yang | H02M 3/1563 |
| | | | | 323/271 |

FOREIGN PATENT DOCUMENTS

| | | |
|---|---|---|
| TW | I337008 | 2/2011 |
| TW | 201145776 | 12/2011 |
| TW | 201342001 | 10/2013 |
| TW | I426689 | 2/2014 |
| TW | 201705657 | 2/2017 |

* cited by examiner

CONTROL DEVICE AND POWER CONVERSION CIRCUIT THEREOF WITH RECONFIGURABLE POWER STRUCTURE

CROSS-REFERENCE TO RELATED APPLICATION

This application claims the priority benefit of Taiwan application serial no. 106124234, filed on Jul. 20, 2017. The entirety of the above-mentioned patent application is hereby incorporated by reference herein and made a part of this specification.

BACKGROUND

Technical Field

The disclosure is related to a control device and a power conversion circuit thereof and especially is related to a reconfigurable power structure and the power conversion circuit thereof.

Related Art

Corresponding to systematic integration, most of microcontrollers may have built-in low dropout regulators. Besides, as operating voltage of core logic in the microcontroller is reduced, the microcontroller further includes a switching voltage converter. However, when the microcontroller enters sleep status or low power consumption status, the operating current of the microcontroller may be only several micro amperes (μA) or be lower than micro ampere. Therefore, in sleep status or low power consumption status, if microcontroller supplies power by continuously using the switching voltage converter, power consumption will be increased. Besides, in recent years, the application of microcontrollers integrated with radio frequency circuit has increased. However, when microcontroller operates the radio frequency circuit, power source noise introduced by the switching voltage converter often interferes the radio frequency circuit.

SUMMARY

The invention provides a control device and a power conversion circuit thereof, and the control device may supply power by selectively using a low dropout regulator or a switching voltage converter, so as to useful to reduce consumption of power and the interference of noise of the power source.

The invention provides a control device including a first switch, a second switch, a switching circuit, a first circuit, and a second circuit. The first switch and the second switch are connected between a power voltage and a ground terminal in series, and a first node electrically is connected to an impedance circuit through a first pin of the control device. The first node is disposed between the first switch and the second switch. The switching circuit is electrically connected to the first switch and the second switch. The first circuit is electrically connected to the switching circuit. The first circuit and the first switch are configured to form a low dropout regulator when an operating current of the control device is smaller than a current threshold value. An output signal of the first circuit is transmitted to a control terminal of the first switch through the switching circuit, and a low dropout regulator is formed by the first circuit and the first switch. The second circuit is electrically connected to the switching circuit. The first switch, the second switch and the impedance circuit are configured to form a switching voltage converter when the operating current of the control device is not smaller than the current threshold value, a plurality of driving signals of the second circuit are transmitted to the control terminal of the first switch and the control terminal of the second switch through the switching circuit respectively, and a switching voltage converter is formed by the first switch, the second switch and the impedance circuit.

The invention provides a control device including a first switch, a second switch, a switching circuit, a first circuit, and a second circuit. The first switch and the second switch is connected between a power voltage and a ground terminal in series, and a first node electrically connected to an impedance circuit through a first pin of the control device. The first node is disposed between the first switch and the second switch. The switching circuit is electrically connected to the first switch and the second switch. The first circuit and the second circuit are electrically connected to the switching circuit respectively. When the control device operates a pre-determined circuit, the control device switches to a first mode, and when the control device stops operates the pre-determined circuit, the control device switches to the first mode or a second mode according to an operating current. In the first mode, an output signal of the first circuit is transmitted to a control terminal of the first switch through the switching circuit, and the first circuit and the first switch are configured to form a low dropout regulator. In the second mode, a plurality of driving signals of the second circuit are transmitted to the control terminal of the first switch and a control terminal of the second switch through the switching circuit respectively, and the first switch, the second switch and the impedance circuit are configured to form a switching voltage converter.

The invention provides a control device including a first switch, a second switch, a third switch, a first circuit, a second circuit and a switching circuit. The first switch and the second switch are connected between a power voltage and a ground terminal in series, and a first node is electrically connected to a first terminal of an impedance circuit through a first pin of the control device. The first node is disposed between the first switch and the second switch. The third switch has a first terminal electrically connected to the first node, and a second terminal is electrically connected to a second terminal of the impedance circuit through a second pin of the control device. The first circuit and the second circuit are respectively electrically connected to the second pin. In a first mode, the control device conducts the third switch, the switching circuit transmits an output signal of the first circuit to a control terminal of the first switch, and the first circuit and the first switch are configured to form a low dropout regulator. In a second mode, the control device turns off the third switch, the switching circuit transmits a plurality of driving signals of the second circuit to the control terminal of the first switch and a control terminal of the second switch respectively, and the first switch, the second switch and the impedance circuit are configured to form a switching voltage converter.

The invention provides a power conversion circuit including a first switch, a second switch, an amplifier, and a switching circuit. The first switch and the second switch are connected between a power voltage and a ground terminal in series, and a first node is electrically connected to a first terminal of an impedance circuit. The first node is disposed between the first switch and the second switch. The amplifier is electrically connected to a second terminal of the impedance circuit through a voltage divider. The switching circuit is electrically connected to the first switch, the second switch and the amplifier. In a first mode, the power conversion circuit turns off the second switch, the switching circuit conducts an output terminal of the amplifier to a control terminal of the first switch, and the amplifier, the voltage divider and the first switch are configured to form a low dropout regulator. In a second mode, the power conversion circuit disables the amplifier, the switching circuit transmits a plurality of driving signals to a control terminal of the first switch and a control terminal of the second switch respectively, and the first switch, the second switch and the impedance circuit are configured to form a switching voltage converter.

Based on the above, the control device and its power conversion circuit may supply power selectively by using the low dropout regulator or the switching voltage converter, so that it may help to decrease power consumption and interference of power source noise. Besides, due to the switching voltage converter and the low dropout regulator share the first switch, so that production cost and hardware space can be decreased effectively.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
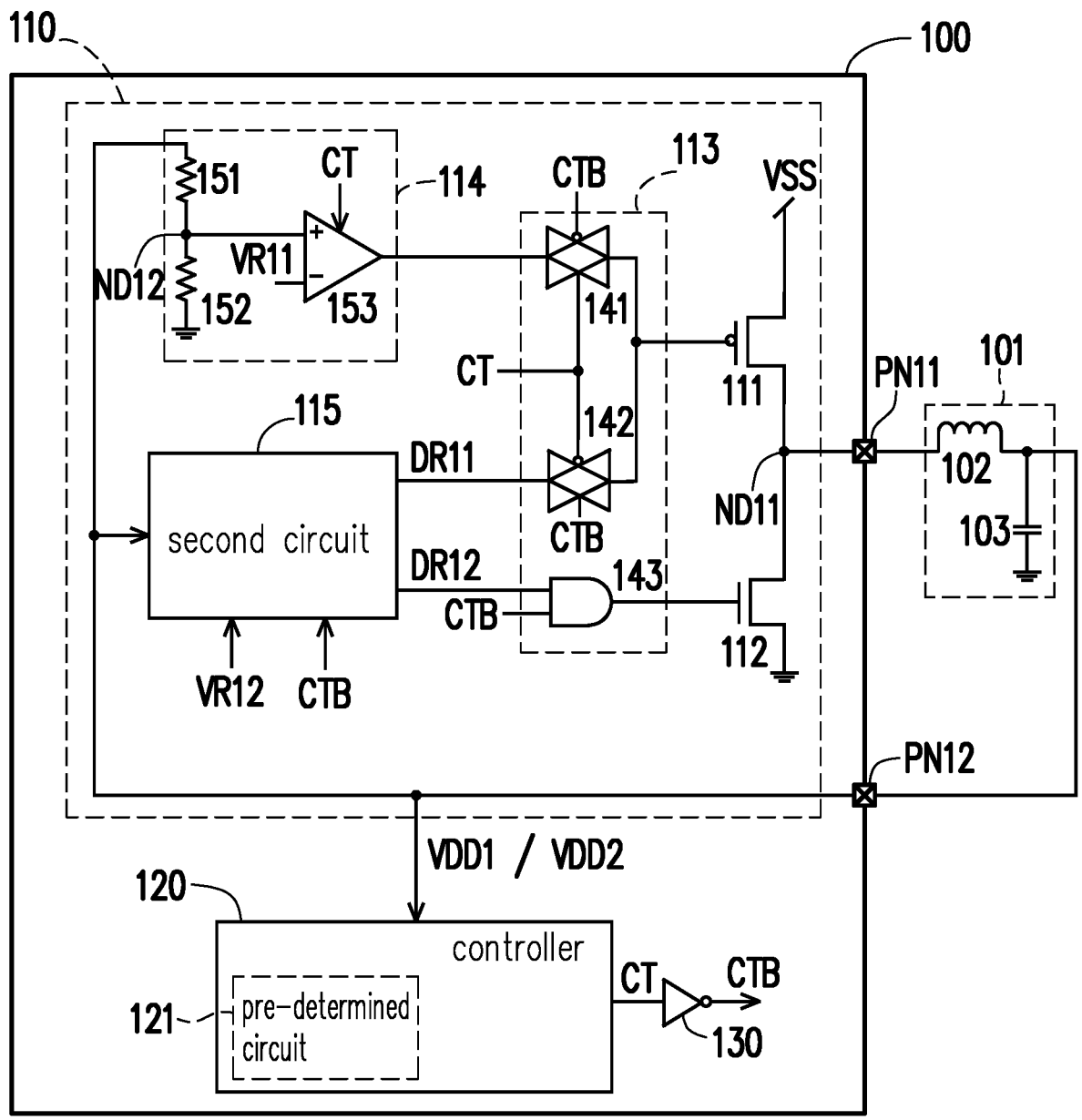
FIG. 1 is a schematic diagram of a control device according to an embodiment of the invention.

FIG. 1 is a schematic diagram of a control device according to an embodiment of the invention. As shown in FIG. 1, a control device 100 including a first pin PN11 and a second pin PN12, and the control device 100 may be electrically connected to an impedance circuit 101 through the first pin PN11 and the second pin PN12. The impedance circuit 101 is set outside of the control device 100. Besides, the control device 100 includes a power conversion circuit 110 and a controller 120. The power conversion circuit 110 is configured to supply power source which the controller 120 requiring. For instance, the controller 120 may be operated under a first operating voltage VDD1 or second operating voltage VDD2 generated by a power conversion circuit 110.

The power conversion circuit 110 includes a first switch 111, a second switch 112, a switching circuit 113, a first circuit 114 and a second circuit 115. The first switch 111 and the second switch 112 connect in series between power voltage VSS and ground terminal. A first node ND11 is electrically connected to first terminal of the impedance circuit 101 through the first pin PN11. The first node ND11 is disposed between the first switch 111 and the second switch 112. The switching circuit 113 is electrically connected to the first switch 111, the second switch 112, the first circuit 114 and the second circuit 115. Besides, the first circuit 114 and the second circuit 115 are electrically connected to second terminal of the impedance circuit 101. The first switch 111 may be a P-type Power PMOSFET, the second switch 112 may be an N-type power MOSFET, but not limited thereto.

In more detail, the switching circuit 113 includes a first transmission gate 141, a second transmission gate 142 and an AND gate 143. The first circuit 114 includes a first resistor 151, a second resistor 152 and an amplifier 153. An input terminal of the first transmission gate 141 is electrically connected to an output terminal of the amplifier 153, and an output terminal of the first transmission gate 141 is electrically connected to the control terminal of the first switch 111. An input terminal of the second transmission gate 142 is electrically connected to the second circuit 115, and an output terminal of the second transmission gate 142 is electrically connected to a control terminal of the first switch 111. Besides, the first transmission gate 141 and the second transmission gate 142 are controlled by control signal CT and inversion signal CTB of the control signal CT. The second circuit 115 may be a buck driving circuit, but not limited thereto.

A first input terminal of the AND gate 143 is electrically connected to the second circuit 115, a second input terminal of the AND gate 143 receives the inversion signal CTB, and the output terminal of AND gate 143 is electrically connected to the control terminal of the second switch 112. The first resistor 151 and the second resistor 152 are connected in series between the second pin PN12 and the ground terminal to form a voltage divider. A first input terminal of the amplifier 153 is electrically connected to the second node ND12 between the first resistor 151 and the second resistor 152. In other words, the amplifier 153 may be electrically connected to the second terminal of the impedance circuit 101 through the voltage divider. Besides, the second input terminal of the amplifier 153 receives first reference voltage VR11, an output terminal of the amplifier 153 is electrically connected to the switching circuit 113, and an enable terminal of the amplifier 153 receives control signal CT.

In operation of the control device 100, the controller 120 may use the control signal CT switching the control device 100 to the first mode or the second mode, and the power conversion circuit 110 of the control device 100 may be corresponding to different mode and be formed in different power source structure. For example: a low dropout regulator and a switching voltage converter. The control signal CT generated by the controller 120 may be converted to the inversion signal CTB through the inverter 130.

In particular, the power conversion circuit 110 may be corresponding to the control signal CT with high level and enter first mode. In the first mode, the controller 120 may enable the amplifier 153 by using the control signal CT with high level, and may disable the second circuit 115 by using the inversion signal CTB with low level. Besides, in the first mode, the first transmission gate 141 and the second transmission gate 142 may be corresponding to the control signal CT and the inversion signal CTB to conduct the control terminal of the first switch 111 to the output terminal of the amplifier 153. The AND gate 143 may output low level signal corresponding to the inversion signal CTB of low level, so as to turns off the second switch 112. At this time, the switching circuit 113 may transmit output signal of the amplifier 153 of the first circuit 114 to the control terminal of the first switch 111, and the first circuit 114 and the first switch 111 may be configured to form the low dropout regulator. Thereby, the control device 100 may use the low dropout regulator to make the power voltage VSS regulated to the first operating voltage VDD1, so that the controller 120 can be operated lower than the first operating voltage VDD1.

On the other hand, the power conversion circuit 110 may enter the second mode corresponding to the control signal CT with low level. In the second mode, the controller 120 may use control signal CT with low level to disable the amplifier 153, and may use the inversion signal CTB with high level to enable the second circuit 115, so as to enable the second circuit 115 may generate a plurality of driving signal DR11~DR12.

Besides, in the second mode, the first transmission gate 141 and the second transmission gate 142 may be corresponding to the control signal CT and the inversion signal CTB to conduct the control terminal of the first switch 111 to the second circuit 115, so as to transmit the driving signal DR11 to the control terminal of the first switch 111. The AND gate 143 may be corresponding to the inversion signal CTB with high level transmits the driving signal DR12 to the control terminal of the second switch 112. At this time, the first switch 111, the second switch 112 and the impedance circuit 101 may be configured to form a switching voltage converter, and the switching voltage converter is controlled by the driving signals DR11~DR12 generated from the second circuit 115.

Thereby, the control device 100 may convert the power voltage VSS to the second operating voltage VDD2 by using the switching voltage converter, so as to cause the controller 120 may be operated at the second operating voltage VDD2. Besides, the second circuit 115 may adjust the driving signals DR11~DR12 according to second reference voltage VR12 and the second operating voltage VDD2. Moreover, the impedance circuit 101 may include an inductor 102 and a capacitive 103, such that a switching voltage converter of buck may be formed by the first switch 111, the second switch 112 and the impedance circuit 101.

In other words, in overall operation of the control device 100, the controller 120 may enable one of the first circuit 114 and the second circuit 115 by using the control signal CT and the inversion signal CTB. Besides, the controller 120 may control the switching circuit 113 by using the control signal CT and the inversion signal CTB. For example, the first transmission gate 141 and the second transmission gate 142 in the switching circuit 113 may conduct the control terminal of the first switch 111 to the output terminal of the amplifier 153 or the second circuit 115. Thereby, the power conversion circuit 110 may form different power source structures, for example: the low dropout regulator and the switching voltage converter. Besides, due to the switching voltage converter and the low dropout regulator formed by the power conversion circuit 110 share the first switch 111, so that the production cost and the hardware space can decrease effectively.

In one embodiment, the control device 100 may reconstruct power source structure of the power conversion circuit 110 according to the operating current of the controller 120, so as to help to reduce power consumption. For instance, the controller 120 may compare operating current and current threshold value to each other, and switch level of the control signal CT according to comparison result, so that the control device 100 may switch to the first mode or the second mode in response to the control signal CT.

Particularly, when the operating current of the controller 120 is smaller than the current threshold value, the controller 120 is situated in light load status (for example, sleep status or low power consumption status). At this time, the controller 120 may switch the power conversion circuit 110 into the first mode, so that (the controller 120) use the low dropout regulator formed by the power conversion circuit 110 to perform power. On the other hand, when the operating current of the controller 120 is not shorter than the current threshold value, it indicates that the controller 120 is in heavy load status. At this time, the controller 120 may switch the power conversion circuit 110 into the second mode, so that (the controller 120) uses the switching voltage converter formed by the power conversion circuit 110 to provide power.

Figure 2:
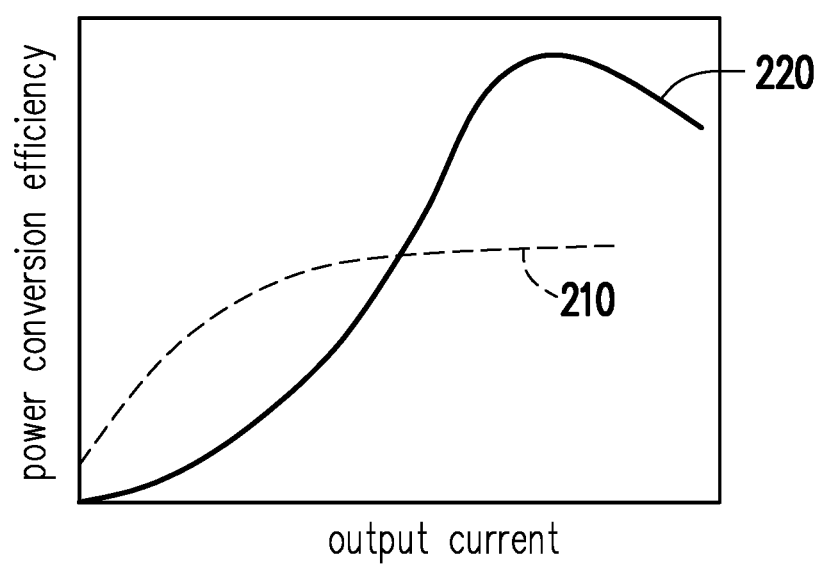
FIG. 2 is a power conversion efficiency diagram of a low dropout regulator and a switching voltage converter at different output current.

It is worth to note that, FIG. 2 is the figure of the power conversion efficiency of the low dropout regulator and the switching voltage converter in different output current. A curve 210 is power conversion efficiency curve of the low dropout regulator, and a curve 220 is power conversion efficiency curve of the switching voltage converter. As shown in FIG. 2, the low dropout regulator has better power conversion efficiency at light load, and the switching voltage converter has better power conversion efficiency at heavy load. In other words, the control device 100 may be corresponding to the load status of the controller 120 to select the power source structure having better power conversion efficiency to supply power to the controller 120. Therefore, the power consumption can be effectively reduced.

Additionally, the low dropout regulator has excellent power supply rejection ratio (PSRR), so that the first operating voltage VDD1 having lower noise may be provide. Therefore, in another embodiment, the control device 100 may further supply power to the pre-determined circuit sensitive with noise by using the low dropout regulator, so that it may reduce the interference from the pre-determined circuit.

Particularly, in another embodiment, the controller 120 includes a pre-determined circuit 121 sensitive to the noise, for example: analog-to-digital converter or radio frequency circuit. Before the controller 120 compares the operating current and the current threshold value, the controller 120 may determine priory whether the pre-determined circuit 121 inside is activated or enabled. When the pre-determined circuit 121 of the controller 120 is enabled (i.e. when the controller 120 operates the pre-determined circuit 121), the controller 120 may switch the power conversion circuit 110 to the first mode, in order to use the low dropout regulator formed by power conversion circuit 110 to supply power. Thereby, the interference of the power source noise to the pre-determined circuit 121 is decreased. On the other hand, when the pre-determined circuit 121 in the controller 120 is disabled (i.e., when the controller 120 stops operating the pre-determined circuit 121), the control device 100 may switch to the first mode or the second mode selectivity according to the operating current, so that it is helpful to decrease power consumption.

Figure 3:
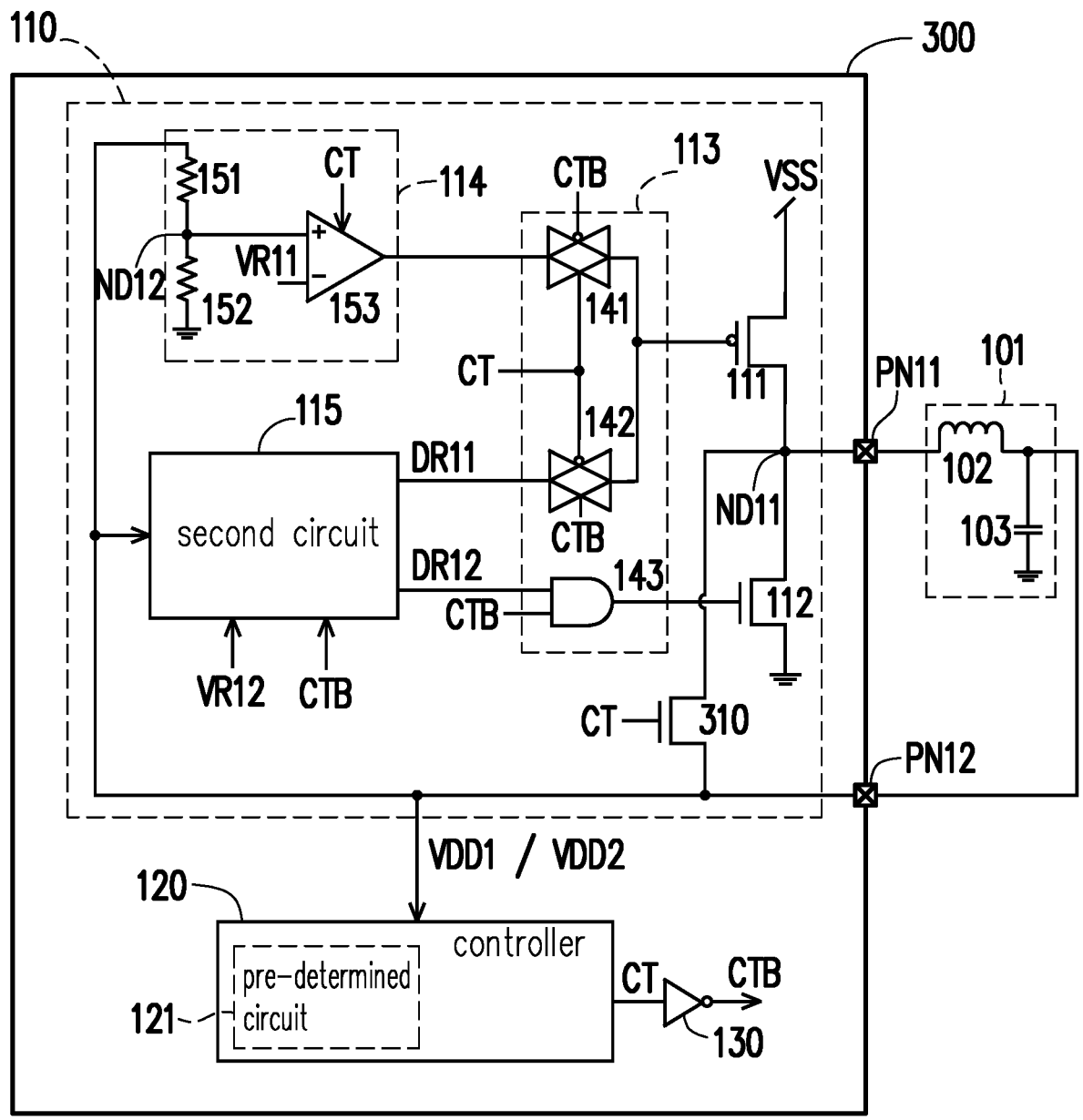
FIG. 3 is a schematic diagram of a control device according to another embodiment of the invention.

FIG. 3 is a schematic diagram of a control device according to another embodiment of the invention. Compared with the embodiment of FIG. 1, the control device 300 of FIG. 3 further comprises a third switch 310. A first terminal of the third switch 310 is electrically connected to the first node ND11, and the second terminal of the third switch 310 is electrically connected to the second terminal of the impedance circuit 101 through the second pin PN12 of the control device 300. The third switch 310 may be an N-type Power PMOSFET.

In operation, when the control device 300 is switched to the first mode, the control device 300 conducts the third switch 310, and the first circuit 114 and the first switch 111 may be configured to form the low dropout regulator. At this point, the third switch 310 which is conducted may made two ends of the inductor 102 in the impedance circuit 101 short circuit, so as to make the current from the first switch 111 may transmit to the first circuit 114 through the third switch 310, not flowing through the inductor 102. Thereby, the effect of the inductor 102 to the low dropout regulator may be prevented, and the interference of the power source noise to the pre-determined circuit 121 may be further decreased. Besides, when the control device 300 is switched to the second mode, the control device 300 turns off the third switch 310, and the first switch first switch, the second switch 112 and the impedance circuit 101 are configured to form the switching voltage converter.

Similar to the embodiment of FIG. 1, the controller 120 may determine whether the pre-determined circuit 121 in the internal is activated or enable. When the pre-determined circuit 121 in the controller 120 is enabled (i.e., when the controller 120 operates the pre-determined circuit 121), the controller 120 may switch the control device 300 to the first mode. On the other hand, when the pre-determined circuit 121 in the controller 120 is disabled (i.e., when the controller 120 stops to operate the pre-determined circuit 121), the controller 120 may compare the operating current and the current threshold value, and then switch the control device 300 to the first mode or the second mode according to the comparison result. The detail configuration and operation in each device of FIG. 3 has included in the embodiment in FIG. 1 and FIG. 2, and is not repeated here.

To summarize, the control device of the disclosure may selectivity switch to the first mode or the second mode corresponding to the operating current of the controller and the operational state of the pre-determined circuit in the controller, and the power conversion circuit in the control device may form different power source structure according to different mode, for example: the low dropout regulator and the switching voltage converter. Thereby, power consumption and interference of power noise of the control device and the power conversion circuit thereof may be decreased effectively. Besides, the switching voltage converter and the low dropout regulator formed by the power conversion circuit share the first switch, so that production cost and hardware space may be decreased.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A control device, comprising:
  a first switch and a second switch, connected between a power voltage and a ground terminal in series, and a first node electrically connected to an impedance circuit through a first pin of the control device, wherein the first node is disposed between the first switch and the second switch;
  a switching circuit, electrically connected to the first switch and the second switch;
  a first circuit, electrically connected to the switching circuit, wherein when an operating current of the control device is smaller than a current threshold value, an output signal of the first circuit is transmitted to a control terminal of the first switch through the switching circuit, and the first circuit and the first switch are configured to form a low dropout regulator;
  a second circuit, electrically connected to the switching circuit, wherein when the operating current of the control device is not smaller than the current threshold value, a plurality of driving signals of the second circuit are transmitted to the control terminal of the first switch and the control terminal of the second switch through the switching circuit respectively, and the first switch, the second switch and the impedance circuit are configured to form a switching voltage converter; and
  a controller, comparing the operating current and the current threshold value, and the control device switching to a first mode or a second mode according to a comparison result of the operating current and the current threshold value, wherein in the first mode, the control device turns off the second switch, and regulates the power voltage to a first operating voltage by using the low dropout regulator, and the controller operates under the first operating voltage generated by the low dropout regulator, wherein in the second mode, the control device converts the power voltage to a second operating voltage using the switching voltage converter, and the controller operates under the second operating voltage generated by the switching voltage converter.

2. The control device of claim 1, wherein the controller further switches a level of a control signal according to the comparison result, wherein the controller enables one of the first circuit and the second circuit by using the control signal and an inversion signal of the control signal, and controls the switching circuit by the control signal and the inversion signal of the control signal.

3. The control device of claim 2, wherein the control device is electrically connected to two ends of the impedance circuit through the first pin and a second pin, and the first circuit comprises:
  a first resistor and a second resistor, connected between the second pin and the ground terminal in series; and
  an amplifier, having a first input terminal electrically connected to a second node between the first resistor and the second resistor, a second input terminal receiving a first reference voltage, and an output terminal electrically connected to the switching circuit,
  wherein the controller disables or enables the amplifier through the control signal, and disables or enables the second circuit through the inversion signal of the control signal.

4. The control device of claim 3, wherein the switching circuit comprises:
  a first transmission gate, having an input terminal electrically connected to the output terminal of the amplifier, and an output terminal electrically connected to the control terminal of the first switch;
  a second transmission gate, having an input terminal electrically connected to the second circuit, and an output terminal electrically connected to the control terminal of the first switch, wherein the first transmission gate and the second transmission gate conduct the control terminal of the first switch to the output terminal of the amplifier or the second circuit corresponding to the control signal and the inversion signal; and
  an AND gate, having a first input terminal electrically connected to the second circuit, a second input terminal receiving the inversion signal, and an output terminal electrically connected to the control terminal of the second switch.

5. A control device, comprising:
  a first switch and a second switch, connected between a power voltage and a ground terminal in series, and a first node electrically connected to an impedance circuit through a first pin of the control device, wherein the first node is disposed between the first switch and the second switch;
a switching circuit, electrically connected to the first switch and the second switch;
a first circuit and a second circuit, electrically connected to the switching circuit respectively, wherein when the control device operates a pre-determined circuit, the control device switches to a first mode, and when the control device stops operating the pre-determined circuit, the control device switches to the first mode or a second mode according to an operating current,
wherein in the first mode, an output signal of the first circuit is transmitted to a control terminal of the first switch through the switching circuit and the first circuit and the first switch are configured to form a low dropout regulator, wherein in the second mode, a plurality of driving signals of the second circuit are transmitted to the control terminal of the first switch and a control terminal of the second switch through the switching circuit respectively, and the first switch, the second switch and the impedance circuit are configured to form a switching voltage converter,
wherein the control further comprising:
a controller, comprising the pre-determined circuit, wherein the controller determines whether the pre-determined circuit is enabled before comparing the operating current and a current threshold value,
wherein when the pre-determined circuit is enabled, the controller switches the control device to the first mode, wherein when the pre-determined circuit is disabled, the controller compares the operating current and the current threshold value, then switches the control device to the first mode or the second mode according to a comparison result of the operating current and the current threshold value.

6. The control device of claim 5, wherein the pre-determined circuit is an analog-to-digital converter or a radio frequency circuit.

7. The control device of claim 6, wherein the control device is electrically connected to two ends of the impedance circuit through the first pin and a second pin, and the first circuit comprises:
a first resistor and a second resistor, connected between the second pin and the ground terminal in series; and
an amplifier, having a first input terminal electrically connected to a second node between the first resistor and the second resistor, a second input terminal receiving a first reference voltage, and an output terminal electrically connected to the switching circuit, wherein the controller enables one of the amplifier and the second circuit by using a control signal and an inversion signal of the control signal.

8. The control device of claim 7, wherein the switching circuit comprises:
a first transmission gate, having an input terminal electrically connected to the output terminal of the amplifier, and an output terminal electrically connected to the control terminal of the first switch;
a second transmission gate, having an input terminal electrically connected to the second circuit, an output terminal electrically connected to the control terminal of the first switch, wherein the first transmission gate and the second transmission gate conduct the control terminal of the first switch to the output terminal of the amplifier or the second circuit corresponding to the control signal and the inversion signal of the control signal; and
an AND gate, having a first input terminal electrically connected to the second circuit, the second input terminal receiving the inversion signal of the control signal, and an output terminal electrically connected to the control terminal of the second switch.

9. A control device, comprising:
a first switch and a second switch, connected between a power voltage and a ground terminal in series, and a first node electrically connected to a first terminal of an impedance circuit through a first pin of the control device, wherein the first node is disposed between the first switch and the second switch;
a third switch, having a first terminal electrically connected to the first node, and a second terminal electrically connected to a second terminal of the impedance circuit through a second pin of the control device;
a first circuit and a second circuit, respectively electrically connected to the second pin; and
a switching circuit, wherein in a first mode, the control device conducts the third switch, the switching circuit transmits an output signal of the first circuit to a control terminal of the first switch and the first circuit and the first switch are configured to form a low dropout regulator and regulates the power voltage to a first operating voltage by using the low dropout regulator,
wherein in a second mode, the control device turns off the third switch, the switching circuit transmits a plurality of driving signals of the second circuit to the control terminal of the first switch and a control terminal of the second switch respectively, and the first switch, the second switch and the impedance circuit are configured to form a switching voltage converter and regulates the power voltage to a second operating voltage by using the switching voltage converter,
wherein the control device further comprising:
a controller, comprising a pre-determined circuit, wherein the controller determines whether the pre-determined circuit is enabled before comparing the operating current and a current threshold value,
wherein when the pre-determined circuit is enabled, the controller switches the control device to the first mode, and when the pre-determined circuit is disabled, the controller compares the operating current and the current threshold value, then switches the control device to the first mode or the second mode according to a comparison result of the operating current and the current threshold value.

10. The control device of claim 9, wherein the pre-determined circuit is an analog-to-digital converter or a radio frequency circuit.

11. The control device of claim 9, wherein the first circuit comprises:
a first resistor and a second resistor, connected between the second pin and the ground terminal in series; and
an amplifier, having a first input terminal electrically connected to a second node between the first resistor and the second resistor, a second input terminal receiving a first reference voltage, an output terminal electrically connected to the switching circuit, wherein the controller enables one of the amplifier and the second circuit by using a control signal and an inversion signal of the control signal.

12. The control device of claim 11, wherein the switching circuit comprises:

a first transmission gate, having an input terminal electrically connected to the output terminal of the amplifier, an output terminal electrically connected to the control terminal of the first switch;

a second transmission gate, having an input terminal electrically connected to the second circuit, an output terminal electrically connected to the control terminal of the first switch, wherein the first transmission gate and the second transmission gate conduct the control terminal of the first switch to the output terminal of the amplifier or the second circuit corresponding to the control signal and the inversion signal of the control signal; and an AND gate, having a first input terminal electrically connected to the second circuit, a second input terminal receiving the inversion signal of the control signal, and an output terminal electrically connected to the control terminal of the second switch.

13. A power conversion circuit, comprising:

a first switch and a second switch, connected between a power voltage and a ground terminal in series, and a first node electrically connected to a first terminal of an impedance circuit, wherein the first node is disposed between the first switch and the second switch;

an amplifier, electrically connected to a second terminal of the impedance circuit through a voltage divider; and a switching circuit, electrically connected to the first switch, the second switch and the amplifier, wherein in a first mode, the power conversion circuit turns off the second switch, the switching circuit conducts an output terminal of the amplifier to a control terminal of the first switch, and the amplifier, the voltage divider and the first switch are configured to form a low dropout regulator, and regulates the power voltage to a first operating voltage by using the low dropout regulator, wherein in a second mode, the power conversion circuit disables the amplifier, the switching circuit transmits a plurality of driving signals to a control terminal of the first switch and a control terminal of the second switch respectively, and the first switch, the second switch and the impedance circuit are configured to form a switching voltage converter, and regulates the power voltage to a second operating voltage by using the switching voltage converter, wherein the power conversion circuit is adapted to a control device including a pre-determined circuit, wherein the controller determines whether the pre-determined circuit is enabled before comparing the operating current and a current threshold value, wherein when the control device operates the pre-determined circuit, the control device switches the power conversion circuit to the first mode, and when the control device stops operating the pre-determined circuit, the controller compares the operating current and the current threshold value, then the control device switches the power conversion circuit to the first mode or the second mode according to a comparison result of the operating current and the current threshold value.

14. The power conversion circuit of claim 13, further comprising:

a third switch, electrically connected between the first node and a second terminal of the impedance circuit, wherein in the first mode, the power conversion circuit conducts the third switch, wherein in the second mode, the power conversion circuit turns off the third switch.

15. The power conversion circuit of claim 14, further comprising:

a second circuit, electrically connected to the switching circuit, and generating the plurality of driving signals in the second mode.

16. The power conversion circuit of claim 15, wherein the switching circuit comprises:

a first transmission gate, having an input terminal electrically connected to the output terminal of the amplifier, an output terminal electrically connected to the control terminal of the first switch;

a second transmission gate, having an input terminal electrically connected to the second circuit, an output terminal electrically connected to the control terminal of the first switch, wherein the first transmission gate and the second transmission gate conduct the control terminal of the first switch to the output terminal of the amplifier or the second circuit corresponding to the control signal and the inversion signal of the control signal; and an AND gate, having a first input terminal electrically connected to the second circuit, a second input terminal receiving the inversion signal of the control signal, and an output terminal electrically connected to the control terminal of the second switch.

* * * * *